No. 784,138.

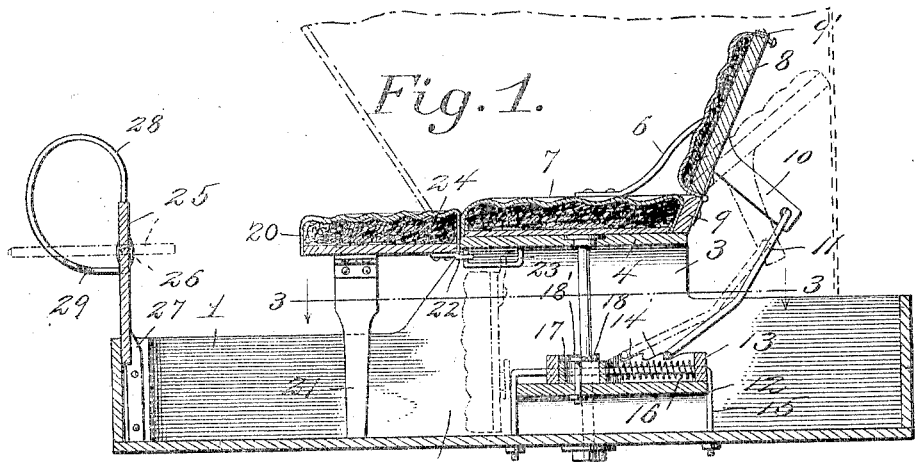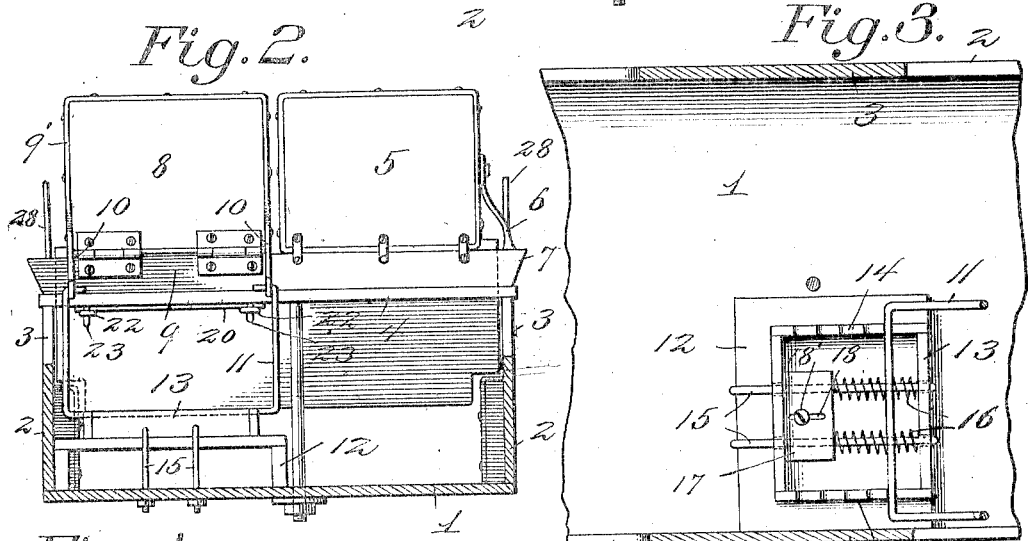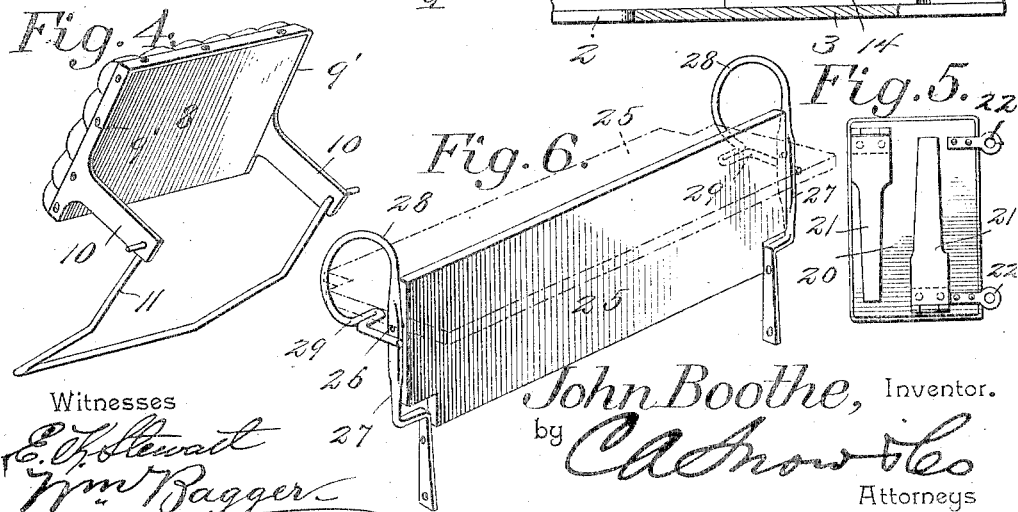

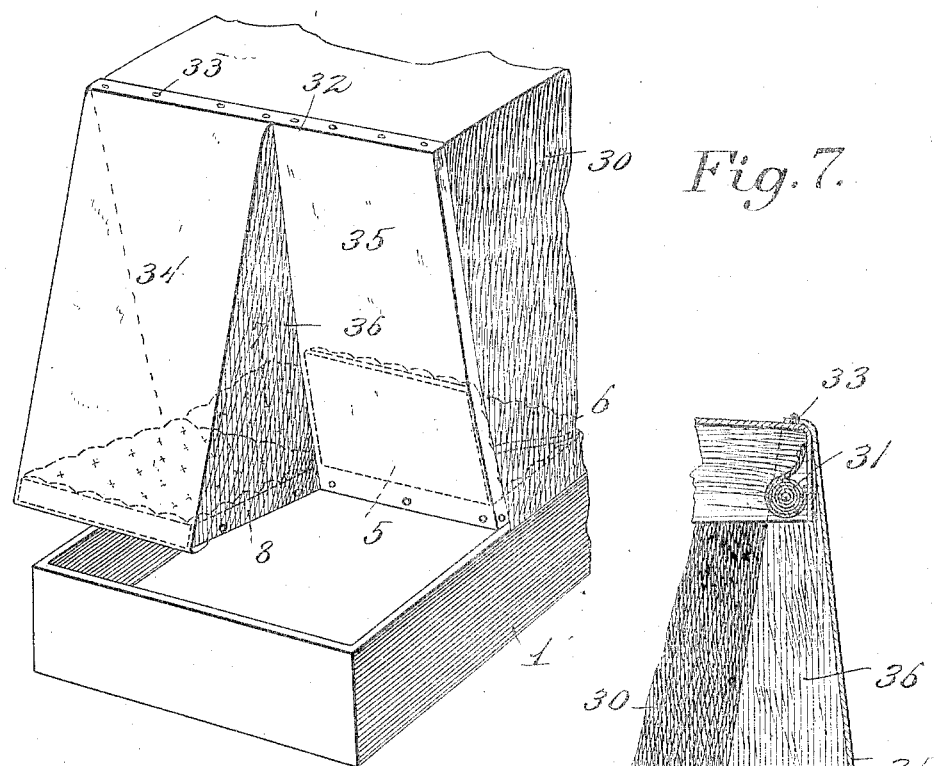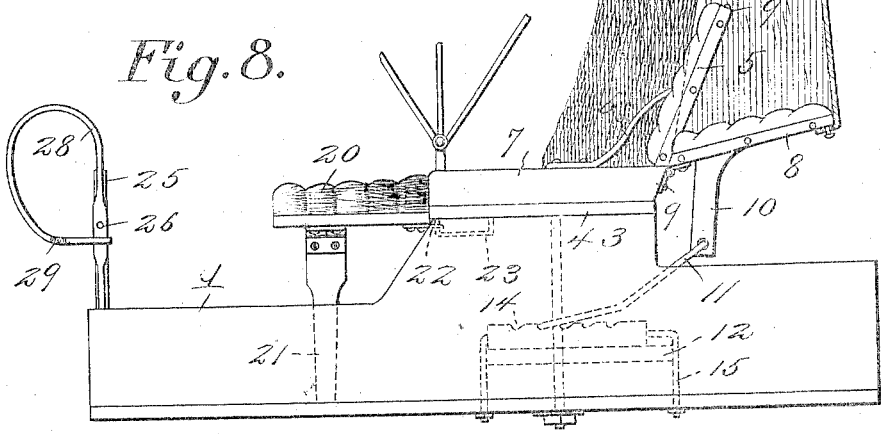

Patented March 7, 1905.

UNITED STATES PATENT OFFICE.

JOHN BOOTHE, OF FORT WORTH, TEXAS.

VEHICLE.

SPECIFICATION forming part of Letters Patent No. 784,138, dated March 7, 1905.

Application filed March 18, 1904. Serial No. 198,717.

*To all whom it may concern:*

Be it known that I, JOHN BOOTHE, a citizen of the United States, residing at Fort Worth, in the county of Tarrant and State of Texas, have invented a new and useful Vehicle, of which the following is a specification.

This invention relates to vehicles, such as buggies, for the transportation of passengers; and it has for its object to provide a vehicle of this class especially intended and adapted for the use of travelers who by force of circumstances are compelled to travel long distances, frequently at night, in sections of the country which are not readily accessible except by vehicle.

The invention may be described as consisting in a buggy or similar vehicle which may be readily transformed to provide a couch upon which the traveler may recline while in transit.

Specifically, the invention consists in certain improvements in the construction, arrangement, and combination of parts, which will be hereinafter fully described, and particularly pointed out in the claims.

In the accompanying drawings has been illustrated a simple and preferred form of embodiment of the invention, it being understood, however, that I do not necessarily limit myself to the precise structural details therein exhibited, but reserve the right to such changes, alterations, and modifications as come fairly within the scope of the invention and may be resorted to without departing from the spirit or sacrificing the efficiency of the same.

In said drawings, Figure 1 is a longitudinal vertical sectional view of a buggy-box constructed and equipped in accordance with the principles of my invention. Fig. 2 is a vertical sectional view taken on a plane in rear of and looking in the direction of the seat. Fig. 3 is a horizontal sectional view taken on the line 3 3 in Fig. 1. Fig. 4 is a perspective detail view of the adjustable back. Fig. 5 is a bottom plan view of the foldable seat extension, showing the means of connecting the same with the seat. Fig. 6 is a perspective detail view of the adjustable dashboard and the supporting means for the same. Fig. 7 is a perspective rear view showing a portion of a vehicle equipped with my improvements and illustrating the back curtain used in connection with the reclining-seat. Fig. 8 is a side elevation, partly in section, of a vehicle equipped as in Fig. 7.

Corresponding parts in the several figures are indicated by similar numerals of reference.

In carrying out the invention the same may be applied to a vehicle box or body of any suitable well-known construction, the same being shown in the drawings at 1. The sides 2 2 of the body have upwardly-extending brackets 3, supporting a seat 4, which is preferably made of ample dimensions. The back of the seat is divided into two parts or sections, one of which, 5, is permanently supported by means of a bracket 6, connecting one end of said back-section with one of the side rails 7 of the seat. Additional stiffening or supporting means may be used when desired. The other back-section, 8, is connected hingedly with the back rail 9 of the seat in such a manner that it may be folded in a downward and rearward direction. Under the preferred construction illustrated in the drawings the adjustable back-section 8 is provided with a metallic rim or band 9', having a pair of rearwardly-extending brackets 10 10 at the sides thereof.

11 designates a yoke, the ends of the arms of which are hingedly connected with the brackets 10. The yoke 11 constitutes a supporting device for the adjustable back-section 8, as will be presently understood.

Upon the buggy-box, below that part of the seat which is provided with the hinged back-section 8, is constructed a platform 12, upon which is mounted a longitudinally-slidable frame 13, the sides of which are provided with ratchet-teeth 14. This frame is retained upon the platform by means of a pair of longitudinal clips 15, the downturned ends of which are suitably connected with the bottom of the buggy. One or more springs are to be suitably arranged to exercise tension in a rearward direction upon the slidable frame 13. In the form herein illustrated helical springs 16 have been shown, said springs being coiled upon the clip-rods 15 in such a manner as to bear against the rear end of the frame and against the cross-piece or abutment 17, mounted upon the platform 12. It is to be understood that any suitable spring means may be employed for the purpose of exercising tension in a rearward direction upon the slidable frame 12. Also that the latter may, if desired, be mounted directly upon the bottom of the buggy. Also that any other mechanical structural changes may be made within the scope of my invention. The frame 12, which I shall designate the "ratchet-frame," serves to engage the yoke 11, so as to sustain the back-section 8 of the seat in any position to which it may be adjusted. It will further be seen that the support is by no means a rigid, but, on the contrary, a flexible one, the degree of flexibility of which may be determined by the stiffness of the springs 16, which in turn may be regulated by adjustment of the block or abutment 17 longitudinally with relation to the sliding frame 12. To provide for such adjustment, the block or abutment may be provided with a longitudinal slot 18 for the passage of the securing-bolt 18', or any other suitable means may be employed for regulating the tension.

Hingedly connected with that part of the buggy which supports the hinged back-section 8 is a seat extension 20, having folding legs 21 hingedly connected with the under side thereof, said legs being capable of folding out of the way under the extension 20 when the latter is not in use. This seat extension may be provided with eyes 22, engaging elongated staples 23, which extend under the seat 4, so that when the legs or supports 21 are folded under the extension 20 the latter may be folded downward and pushed back out of the way under the seat, said seat extension being preferably made of a size which will enable it to fit snugly between the under side of the seat 4 and the bottom of the buggy. The seat extension, as well as the buggy-seat, is to be suitably proportioned, and a cushion 24 is to be provided for the seat.

The back of the seat, composed of the sections 5 and 8, will under my improved construction be made higher than the backs of buggy-seats of ordinary construction, no limitation being placed upon the exact height. It will be seen that by adjusting the supporting-yoke 11 with relation to the ratchet-frame 13, near the front end of the latter, the back-section 8 may be folded down to an approximately horizontal position or to any desired inclination with relation to the seat, while the seat extension 20 may be folded forward and outward, so that the seat, the back, and the front extension shall coöperate to form a couch which will comfortably support the head, the body, and the hips of a person.

In order to provide a suitable foot-support, I avail myself of the dashboard 25, which is mounted pivotally, as upon pins 26, between a pair of uprights or standards 27. Said standards, under the construction illustrated in the drawings, are provided with forwardly-extending loops 28, having laterally-extending arms 29, which when the dashboard is swung upon its pivots to an approximately horizontal position will serve to support and retain the dashboard in such position. It is obvious that the precise configuration of the uprights or standards 27 is non-essential, it being only necessary that they shall be provided with arms or brackets, which when the dashboard is tilted to an approximately horizontal position shall serve to sustain it in such position where it will constitute a most convenient and comfortable foot-support for the traveler reclining upon the couch which has been provided by the proper adjustment of the adjustable seat-section 8 and the seat extension 20.

It will be observed that the adjustable-back feature, as well as the seat extension, is applied only to the half of the seat which is to be occupied by the traveler, while these features are omitted from the part of the seat occupied by the driver, whose movements will not in any wise be hampered by their presence. It is obvious, however, that the portion of the seat equipped with my improvements is not necessarily limited to one half.

In connection with my improved seat construction it will sometimes be found necessary to use a specially-constructed back curtain connected with the top of the vehicle. The ordinary vehicle-top will not permit the folding seat-section 8 to be folded back to its full extent without previously loosening or partially removing the back curtain, which constitutes the rear portion of the vehicle-top. This would obviously expose the occupant to the hot rays of the sun or to the inclemency of the weather, as the case might be. I have, therefore, devised a specially-constructed back curtain adapted to be used in connection with a vehicle having my improved seat, and this special top construction or curtain construction has been illustrated particularly in Figs. 7 and 8 of the drawings. In these figures, 30 designates the vehicle-top, which may be of the ordinary folding variety or of any desired construction. This vehicle-top, as is usually the case, is provided with a back curtain 31, the lower edge of which is adapted to be connected with the rear part of the seat when the folding section of the same is in its normal or raised position. When it is desired to use the reclining seat, the back curtain 31 is rolled up, as shown in Fig. 7, and is secured below the buggy-top by means of straps provided for the purpose. An auxiliary curtain 32 is then connected with the upper rear part of the buggy-top by means of buttons or other suitable fastening means 33, said auxiliary curtain comprising two separate flaps 34 and 35, the former of which is provided with side pieces 36, coöperating therewith to form an awning. When this auxiliary curtain is used, the lower edge of the flap 34 is connected by buttons or other suitable means with the back of the folding seat-section 8, while the lower edge of the flap 35 is likewise detachably connected with the lower edge of the stationary seat-section. The awning, composed of the flap 34 and the side members 36, will thus shield the person who reclines upon the couch provided by my invention from rain and sun and enable him to perform a journey in comfort.

The operation and advantages of my invention will be readily understood from the foregoing description, taken in connection with the drawings hereto annexed. The general construction is simple and inexpensive, and the invention may be easily applied to vehicles of the ordinary construction.

Having thus described my invention, I claim—

1. A vehicle-seat having a permanently-supported back-section connected with a portion of its rear edge, a back-section connected hingedly and adjustably with the rear edge of the seat adjacent to the permanently-supported section, and means for retaining said hingedly-mounted back-section at various adjustments.

2. A vehicle-seat, a hingedly-supported back-section for said seat, and means for retaining said back-section in adjusted position, said means including a spring capable of yielding to pressure exerted upon the back-section.

3. A vehicle-seat having a hingedly-mounted back-section, a yoke connected with said back-section, and a ratchet-frame engaging said yoke.

4. A vehicle-seat having a hingedly-mounted back-section, a yoke connected hingedly with the latter, and a slidable spring-actuated ratchet-frame engaging said yoke.

5. A vehicle-seat having a hingedly-mounted back-section, brackets extending rearwardly from the latter, a yoke hingedly engaging said brackets, and a slidable spring-actuated ratchet-frame engaging said yoke.

6. A vehicle-seat having a hingedly-mounted back-section, a binding-strip for the latter having rearwardly-extending brackets, a yoke connected hingedly with said brackets, and a slidable spring-actuated ratchet-frame engaging said yoke.

7. A vehicle-seat having a hingedly-mounted back-section, a yoke having hinge connection with the latter, a longitudinally-slidable ratchet-frame engaging said yoke, guide-rods for said frame, spring means to force the latter in a rearward direction, and an adjustable abutment engaging said spring means.

8. A vehicle-seat, a seat extension connected hingedly with the front edge of said seat, and supporting means foldable under said seat extension.

9. A vehicle-seat, a seat extension hingedly and slidingly connected with the front edge of said seat, and supporting members foldable under said seat extension.

10. A vehicle-seat provided with a hinged spring-supported back member and with a hingedly-mounted front extension.

11. A vehicle-seat, a back member hingedly and adjustably connected with the rear edge of said seat, a front extension hingedly connected with the front edge of said seat, and foldable supporting means for said front extension.

12. A vehicle-seat having a hingedly-mounted back member, supporting and adjusting means for said back member including spring means adapted to yield to pressure exercised in a downward direction upon the back member when the latter is tilted, a front extension hingedly and adjustably connected with the front edge of the seat, and foldable supporting means for said front extension.

13. A pair of standards, a dashboard supported pivotally between said standards, and means for supporting said dashboard in an approximately horizontal position.

14. A pair of standards, a dashboard supported pivotally between said standards, and bracket means upon said standards for supporting the dashboard in an approximately horizontal position.

15. A pair of standards having brackets provided with laterally-extending arms and a dashboard supported pivotally between said standards and adapted to be supported in an approximately horizontal position upon the arms extending from the brackets of said standards.

16. A vehicle having a reclining seat, a pivoted dashboard, and means for supporting the latter in an approximately horizontal position.

17. A vehicle having a seat, a back member connected hingedly and adjustably with the rear edge of said seat, a front extension connected hingedly and adjustably with the front edge of said seat, supporting means for said front extension, a pair of standards, a dashboard supported pivotally between said standards, and means for supporting said dashboard in an approximately horizontal position.

18. A vehicle having a seat provided with a hinged back-section, a top, and an auxiliary back curtain adapted to be connected with the hinged back-section when the latter is folded down from its upright position.

19. A vehicle-seat having a permanently-supported back-section and a hingedly-supported back-section, in combination with a top having a back curtain composed of flaps adapted to be separately connected with the permanently-supported back-section and with the hingedly-supported back-section when the latter is folded down from its upright position.

20. In a vehicle, a seat having a back composed of a plurality of sections, one of said sections being hingedly connected with the seat and capable of being folded to a reclining position, in combination with a top having a back curtain provided with a flap having side members adapted for connection with the back and sides of the hinged back-section of the seat.

21. A vehicle having a seat provided with a hinged, adjustable, reclining back portion, in combination with a top having a back curtain provided with an awning adapted to be connected with the reclining back portion of the seat.

In testimony that I claim the foregoing as my own I have hereto affixed my signature in the presence of two witnesses.

JOHN BOOTHE.

Witnesses:
J. C. VAUGHAN,
M. R. CHEEK.